United States Patent
Staddon et al.

(10) Patent No.: US 8,725,651 B2
(45) Date of Patent: May 13, 2014

(54) SYSTEM AND METHOD FOR PROVIDING PRIVATE DEMAND-DRIVEN PRICING

(75) Inventors: Jessica Nicola Staddon, Redwood City, CA (US); Lea Kissner, Cambridge, MA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1639 days.

(21) Appl. No.: 11/592,078

(22) Filed: Nov. 1, 2006

(65) Prior Publication Data
US 2008/0114682 A1 May 15, 2008

(51) Int. Cl.
G06Q 20/00 (2012.01)
G06Q 30/00 (2012.01)
G06Q 40/00 (2012.01)

(52) U.S. Cl.
USPC ............................... 705/64; 705/26.2; 705/37

(58) Field of Classification Search
USPC ........................................................ 705/1–79
See application file for complete search history.

(56) References Cited

U.S. PATENT DOCUMENTS

| | | | | |
|---|---|---|---|---|
| 5,809,144 A * | 9/1998 | Sirbu et al. | | 705/53 |
| 6,076,078 A * | 6/2000 | Camp et al. | | 705/65 |
| 6,269,343 B1 * | 7/2001 | Pallakoff | | 705/26 |
| 7,007,166 B1 | 2/2006 | Moskowitz et al. | | |
| 7,162,447 B1 * | 1/2007 | Cushing | | 705/37 |
| 2001/0049648 A1 * | 12/2001 | Naylor et al. | | 705/37 |
| 2002/0147670 A1 * | 10/2002 | Lange | | 705/35 |
| 2002/0165828 A1 * | 11/2002 | Sakamoto | | 705/64 |
| 2003/0040978 A1 * | 2/2003 | Levine | | 705/26 |
| 2003/0046185 A1 * | 3/2003 | Levine | | 705/26 |
| 2003/0046251 A1 * | 3/2003 | Levine | | 705/400 |
| 2004/0015408 A1 * | 1/2004 | Rauen et al. | | 705/26 |
| 2005/0071249 A1 * | 3/2005 | Nix et al. | | 705/26 |
| 2005/0125364 A1 | 6/2005 | Edmondson et al. | | |
| 2005/0212930 A1 * | 9/2005 | Sim et al. | | 348/231.4 |
| 2006/0080183 A1 * | 4/2006 | Cicotelli | | 705/26 |
| 2006/0089962 A1 * | 4/2006 | Tsukazaki et al. | | 709/200 |
| 2006/0190616 A1 * | 8/2006 | Mayerhofer et al. | | 709/231 |
| 2006/0195352 A1 * | 8/2006 | Goldberg et al. | | 705/9 |
| 2007/0203821 A1 * | 8/2007 | DuFour | | 705/37 |
| 2007/0294131 A1 * | 12/2007 | Roman et al. | | 705/14 |

OTHER PUBLICATIONS

Managerial Economics, 8the Edition—Mark Hirschey pp. 1-15 and 185-216.*

(Continued)

*Primary Examiner* — Alexander Kalinowski
*Assistant Examiner* — Murali Dega
(74) *Attorney, Agent, or Firm* — Patrick J. S. Inouye; Krista A. Wittman; Leonid Kisselev

(57) ABSTRACT

A system and method for providing private demand-driven pricing for fixed cost digital goods are described. An encrypted price of identically-priced digital goods is additively perturbed. The digital goods are stored in a database by a seller system and an approximate revenue maximizing price for the digital goods has not been realized. A purchasing decision about one of the digital goods based upon the additively-perturbed price is sent to the seller system without revealing the particular digital good. A conditionally disclosed symmetric key is received in return under which the digital goods in the database have been encrypted. The purchaser system and seller system engage in symmetric private information retrieval on the database. The purchaser system decrypts the digital good purchased with the symmetric key. The seller system privately updates the encrypted price of the digital goods to close on the approximate revenue maximizing price whenever a purchase is made.

12 Claims, 10 Drawing Sheets

(56) References Cited

OTHER PUBLICATIONS

W. Aiello et al., "Priced Oblivious Transfer: How to Sell Digital Goods," Ad. In Crypt.—Eurocrypt '01 (2001).

R. Clayton et al., "Real World Patterns of Failure in Anonymity Systems," Proc. Of Info. Hiding 2001 (2001).
E. Kushilevetz et al., "Replication Is Not Needed: Single Database, Computationally-Private Information Retrieval," Proc. Of FOCS '97 (1997).

* cited by examiner

110

120

130

140

160

150

SYSTEM AND METHOD FOR PROVIDING PRIVATE DEMAND-DRIVEN PRICING

FIELD

This application relates in general to electronic commerce and, in particular, to a system and method for providing private demand-driven pricing.

BACKGROUND

E-commerce includes the sale and licensing of digital goods through online marketplaces provided over private and publicly available networks, such as the Internet. Some classes of digital goods, such as music, videos, and other forms of entertainment content; news and information; and various types of electronically-stored data, can be sold in unrestricted quantities without incurring changing marginal costs. Other classes of digital goods, such as software or services, generally entail changing supply or other marginal costs due to support or related post-sale needs. Moreover, different types of digital goods can have different supply or marginal costs and, as a result, each unique digital good must be priced separately as a function of those costs and customer demand.

Purchasing, when performed online, requires a secure electronic interchange between e-commerce customer and vendor, either directly or through an intermediary. E-commerce customers expect a reasonable level of security when providing authorization to debit their bank accounts or to access other forms of electronic payment. Additionally, customers are becoming increasingly concerned about their personal privacy. The nature of the goods, for instance, might be personal or sensitive, or the customers might be averse to the collection of personal data or shopping histories, particularly when such information might be provided to third parties. E-commerce vendors rely on trusted infrastructures to both ensure that the customers have funds available to make online purchases and that those funds are reliably received following each purchase.

Pragmatically, online vendors must also ensure that they both earn revenue and meet constraints on the costs of supplying digital goods. Demand-driven pricing allows online vendors to make price changes when necessary. Generally, online vendors seek to maximize revenue for goods with fixed costs, but need to adjust prices for goods with variable supply or marginal costs.

Conventional non-private online marketplaces work well with fixed cost digital goods by allowing prices to freely fluctuate with demand. Prices can rise when demand is high, and fall when demand is low. Such demand-driven price fluctuations occur independently of the vendor and, hopefully, the pricing eventually approaches an optimal level, given costs and demand. Non-private online marketplaces, however, afford no privacy to customers, whose personal data, such as demographics, shopping habits, and preferences, and shopping histories are exposed for potential unauthorized collection and exploitation.

In contrast, conventional private online marketplaces protect customer privacy, but neglect vendor needs. One approach that conceals the types of goods purchased is described in W. Aiello et al., "Priced Oblivious Transfer: How to Sell Digital Goods," *Ad. in Crypt.—Eurocrypt '01* (2001), the disclosure of which is incorporated by reference. Aiello discloses that vendors can store encrypted prices to enable customers to privately transact purchases. However, vendors are unable to track and adjust the price of goods in response to customer demand.

Finally, conventional anonymous online shopping introduces a surrogate agent to transact purchases on behalf of each customer under a pseudonym. However, the pseudonyms can be reused, either out of convenience or expediency, which enables vendors to discover customers' shopping histories. Further shortcomings of anonymous online shopping are described in R. Clayton et al., "Real World Patterns Of Failure in Anonymity Systems," *Proc. of Info. Hiding 2001* (2001), the disclosure of which is incorporated by reference.

Therefore, a need exists for providing private online purchasing that dynamically drives pricing towards a revenue maximizing point for fixed cost digital goods, while allowing customers to buy the goods privately, that is, without the vendor learning which digital good was purchased.

A further need exists for providing private online purchasing that dynamically drives prices for variable-cost digital goods to a point that corresponds to a target supply or marginal cost level.

SUMMARY

A system and method for providing private demand-driven pricing are described. In one embodiment, a private online shopping protocol for digital goods offered at a single price with fixed supply costs is provided. In a further embodiment, a private online shopping protocol for digital goods offered at different prices with variable supply costs is provided. Both protocols require two stages, initialization and shopping. The initialization stage is performed only once prior to any purchasing activities. The shopping stage is performed in three phases, pricing, purchasing, and updating. During the pricing phase, an online buyer learns the price of a digital good. Based on the current price of the digital good, the online buyer can decide whether to purchase and, depending upon the protocol, may engage in the purchasing phase, even if the online buyer does not desire to actually buy the digital good at the offered price. Finally, during the updating phase, the online seller updates the encrypted balance of the online buyer's account and the encrypted prices of the digital goods. The seller cannot compromise the buyer's privacy and the buyer cannot compromise the seller's privacy by obtaining goods for which the buyer has not paid the correct price.

One embodiment provides a system and method for private fixed cost digital goods pricing. An encrypted price is experimentally perturbed for identically-priced digital goods. An approximate revenue maximizing price has not been realized for the digital goods. A purchasing decision about a particular digital good is provided in response to the perturbed encrypted price without revealing the particular digital good. The original encrypted price of the digital goods is privately updated to approach the approximate revenue maximizing price.

A further embodiment provides a system and method for private variable cost digital goods pricing. An encrypted price is experimentally perturbed for non-identically-priced digital goods. A desired marginal pricing level has not been realized for at least one of the digital goods. A purchasing decision about a particular digital good is provided in response to the perturbed encrypted price without revealing the particular digital good. The original encrypted price of the particular digital good is privately updated as a reflection of the desired marginal pricing level.

A further embodiment provides a system and method for providing private demand-driven pricing for fixed cost digital goods. An encrypted price of identically-priced digital goods is additively perturbed. The digital goods are stored in a database by a seller system and an approximate revenue maximizing price for the digital goods has not been realized. A purchasing decision about one of the digital goods based upon the additively-perturbed price is sent from a purchaser system to the seller system without revealing the particular digital good. A conditionally disclosed symmetric key is received in return under which the digital goods in the database have been encrypted. The purchaser system and seller system engage in symmetric private information retrieval on the database. The purchaser system decrypts the digital good purchased with the symmetric key. The seller system privately updates the encrypted price of the digital goods to close on the approximate revenue maximizing price whenever a purchase is made.

A further embodiment provides a system and method for providing private demand-driven pricing for variable cost digital goods that are uniquely priced. A table includes public key encryptions of prices for digital goods stored in a database by a seller system. A desired marginal pricing level has not been realized for at least one of the digital goods. A purchaser system and the seller system engage in symmetric private information retrieval on the table. The price of one of the digital goods is decrypted with a private key for pricing by the purchaser system. The purchaser system sends a purchasing decision about one of the digital goods based upon the decrypted price to the seller system without revealing the particular digital good being purchased. A conditionally disclosed symmetric key for goods is received in return under which the digital goods in the database have been encrypted. The purchaser system and seller system engage in symmetric private information retrieval on the database. The purchaser system decrypts the digital good purchased with the symmetric key for goods. The seller system privately updates the encrypted prices of the digital goods based upon the desired marginal pricing level.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

E-Commerce Marketplace Environment

As described herein, electronic commerce (e-commerce) refers to the pricing and purchasing, licensing, or other types of acquisitions of digital goods through an online marketplace. Additionally, the terms "server," "seller," "vendor," and "offeror" refer to the system that is selling the digital goods online and "client," "buyer," "purchaser," and "offeree" refer to the system that is obtaining the digital goods. These terms are used interchangeably and, unless otherwise noted, have similar meanings.

Figure 1:
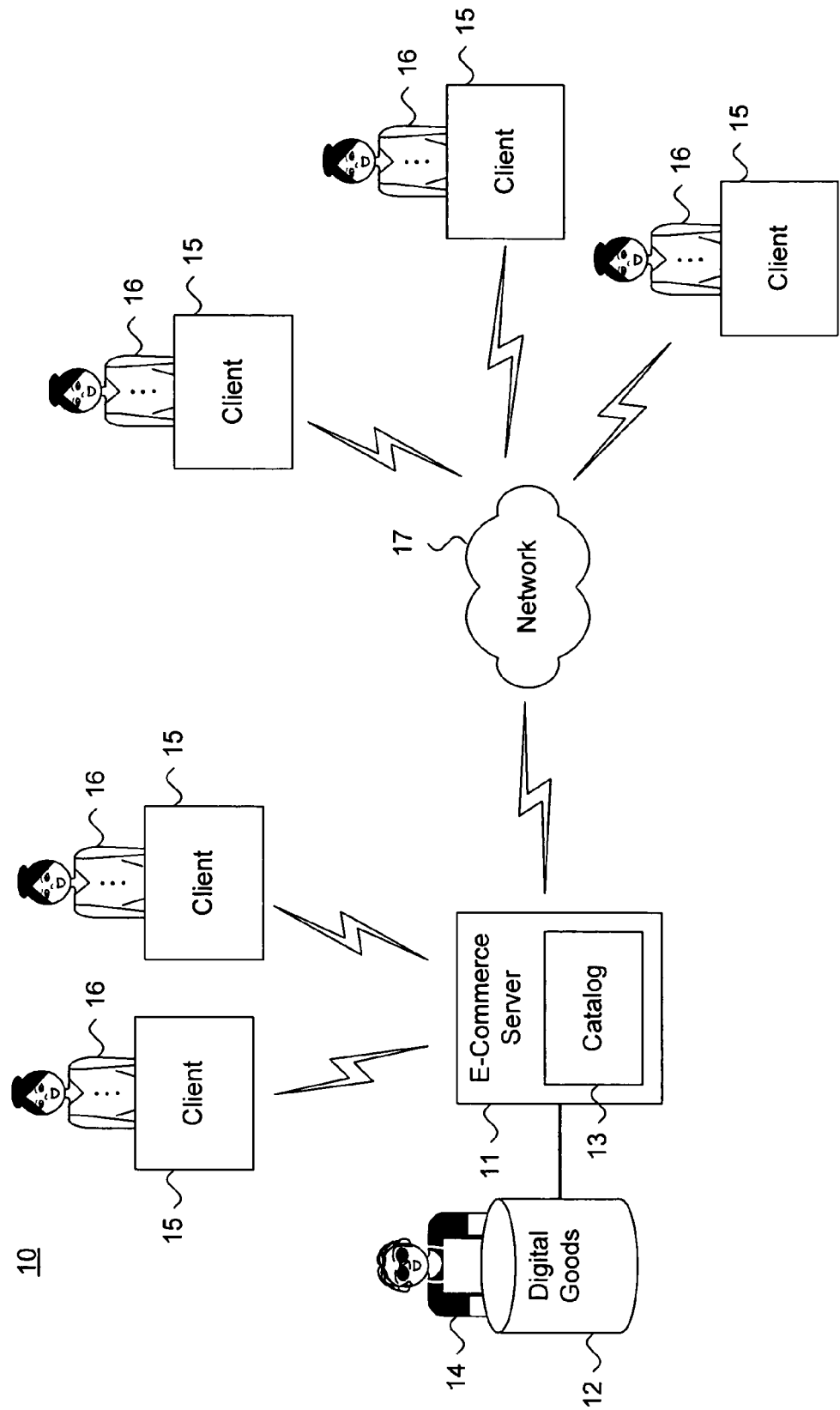
FIG. 1 is a functional block diagram showing, by way of example, an e-commerce marketplace.

At a minimum, an e-commerce marketplace requires a seller system, a buyer system, and an online infrastructure over which digital goods can be offered and purchased. FIG. 1 is a functional block diagram showing, by way of example, an e-commerce marketplace 10. An online vendor 14 offers digital goods 12 over an e-commerce server 11. The digital goods 12 are described in a catalog 13 that is accessible by one or more clients 15 used by an online buyer 16. The clients 15 can interconnect with the e-commerce server 11 either directly or indirectly via a network 17, such as the Internet. Other marketplace components are possible.

The e-commerce server 11 provides a virtual storefront for online sellers 14 of the digital goods 12. The digital goods 12 can include uniformly fixed-priced goods, whose marginal costs are negligible, thereby providing an essentially unlimited supply of goods. These types of goods include entertainment content and other types of electronically-stored data. The online seller's goal is to maximize revenue. The digital goods 12 can also include multiple, differently priced goods with varying supply costs. These goods include software that is distributed online, whereby support costs grow with number of purchases. The online seller's goal is to achieve a optimally-priced sales target that is a function of the supply costs. Other types of digital goods and forms of pricing are possible.

The online sellers 14 "advertise" their digital goods 12 via the catalog 13, which is published by the e-commerce server 11 and is available to any potential online buyer 16 through their client 15. The catalog 13 only lists the types of digital goods 12 offered and not their prices, which are provided one at-a-time upon online buyer request.

The online buyers 16 purchase digital goods 12 through a secure session transacted by their respective clients 15 with the e-commerce server 11, which provides trustworthy and reliable transaction processing. At a minimum, the e-commerce server 11 is aware of the available balance of funds available to the online buyer 16. The e-commerce server 11 is also able to collect payment for digital goods 12 purchased by debiting the price paid, even when the online seller 14 is unaware of what each online buyer 16 is purchasing, such as described in W. Aiello et al., Id.

Prior Art E-Commerce Marketplaces

Figure 2:
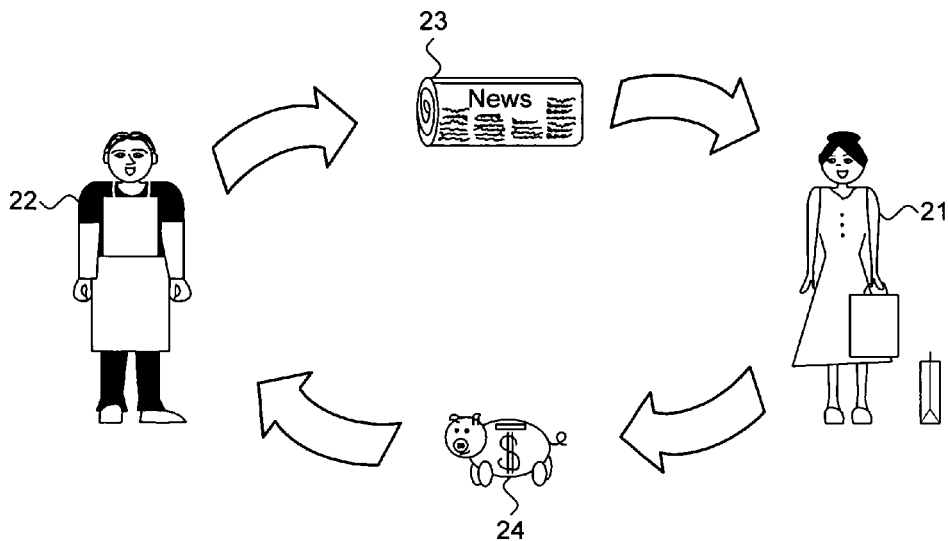
FIG. 2-4 are functional block diagrams showing, by way of example, prior art e-commerce marketplaces.
Figure 3:
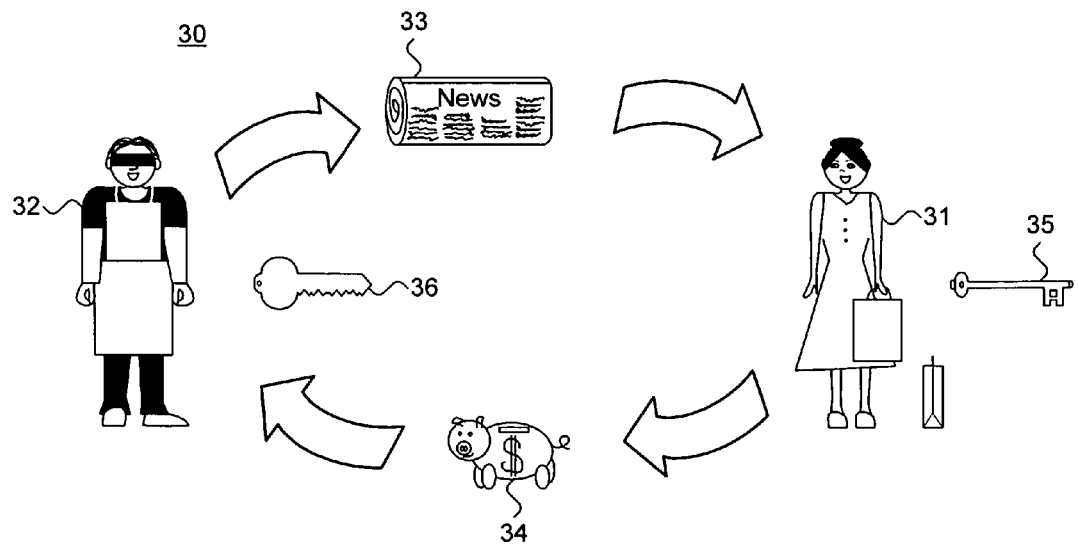
Figure 4:
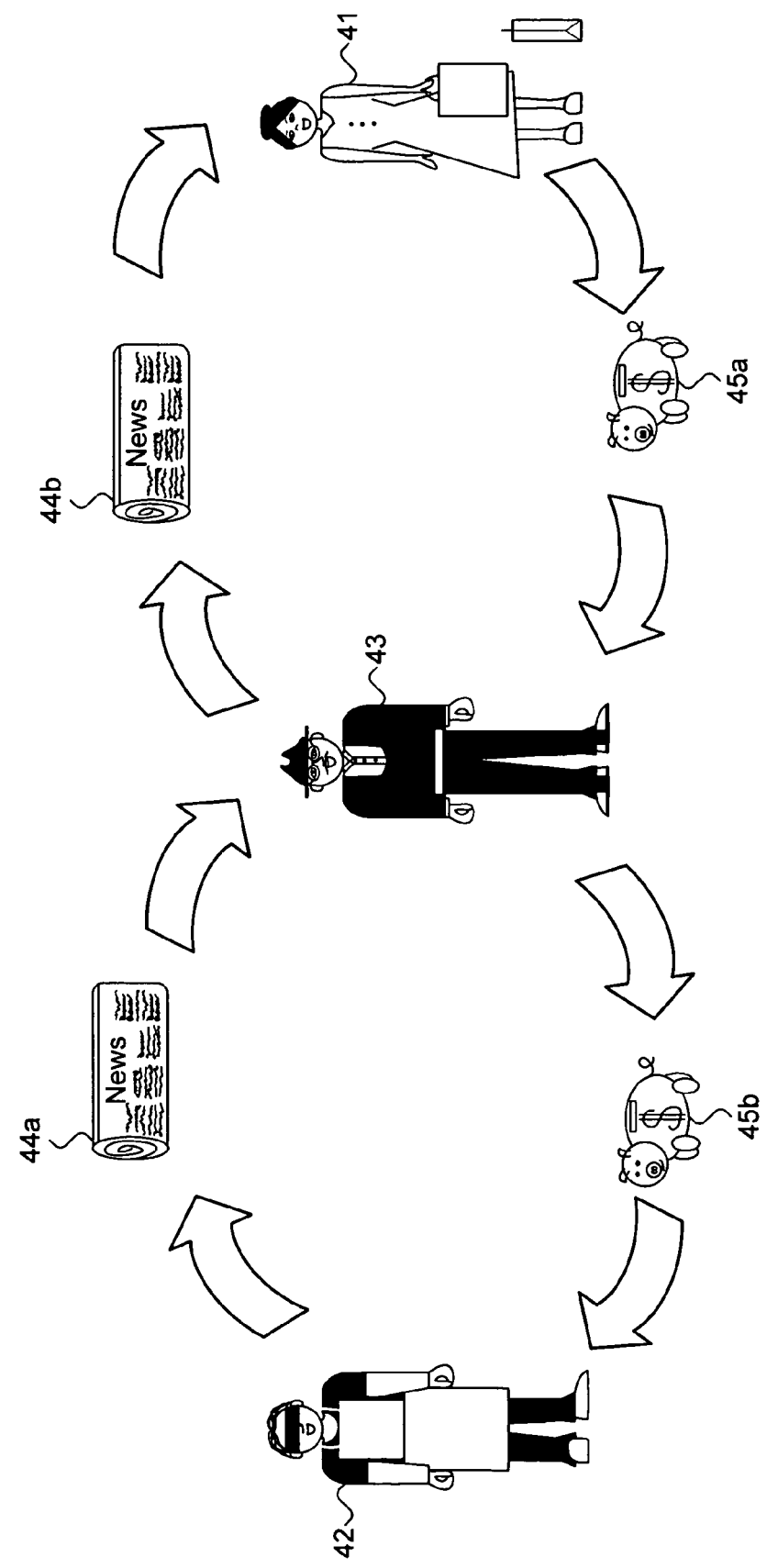

Conventional approaches to providing e-commerce marketplaces fail to satisfactorily meet client privacy and vendor business needs. FIGS. 2-4 are functional block diagrams showing, by way of example, prior art e-commerce marketplaces 20, 30, 40. Each of the e-commerce marketplaces 20, 30, 40 operate in an online marketplace environment, such as described above with reference to FIG. 1.

Referring first to FIG. 2, a non-private e-commerce marketplace 20 is shown. An online buyer 21 can purchase digital goods 23 offered by an online seller 22. The online buyer 21 pays funds 24 through secure means to the online seller 22 in exchange for the online delivery of the digital goods 23. As the price paid for the digital goods 23 is immediately known to the online seller 22, the price can be adjusted to meet customer demand. However, the online seller 22 need not be involved in the process of adjusting the price to meet demand, which can instead be updated autonomously. The online buyer 21 is afforded no privacy as to personal data or shopping history, which the online seller 22 is free to collect and exploit.

Referring next to FIG. 3, a private e-commerce marketplace 30 is shown. An online buyer 31 can privately purchase digital goods 33 from an online seller 32 through the use of Private Information Retrieval (PIR) protocols, such as described in E. Kushilevetz and R. Ostrovsky, "Replication Is Not Needed: Single Database, Computationally-Private Information Retrieval," *Proc. of FOCS* '97 (1997), the disclosure of which is incorporated by reference. PIR relies on a public key cryptosystem. The online buyer 31 holds a secret key 35 and makes a public key 36 available for use by all parties. The online seller 32 uses the public key 36 to encrypt the digital goods 33 prior to transmission to the online buyer 31. As a result, the online buyer 31 is able to obtain the digital goods 33 without the online seller 32 being able to distinguish the type of digital good 33 retrieved. The funds 34 for the price of the digital goods 33 purchased are securely collected through conventional trustworthy and reliable means. However, the offered price of the digital goods 33 cannot be privately changed by the online seller 32 in response to demand and must therefore remain fixed, thus artificially limiting the online seller's ability to maximize revenue.

Finally, referring to FIG. 4, an anonymous e-commerce marketplace 40 is shown. An online buyer 41 can purchase digital goods 44a, 44b, from an online seller 42 through an intermediary agent 43, such as provided through commercially-available Websites, such as shopinprivate.com and privateway.com. The intermediary agent 43 functions as a surrogate to the online buyer 41, whose identity is concealed from the online seller 42 using, for instance, a pseudonym. Funds 45a, 45b for the price of the digital goods 44a, 44b are securely collected through the agent 43, thereby ensuring that the identity of the online buyer 41 remains private. However, for convenience or expediency, pseudonyms, if utilized, can be re-used by the intermediary agent 42, which enables the online seller 42 to collect the online shopper's shopping history and possibly other data.

Method for Providing Private Demand-Driven Pricing

Figure 5:
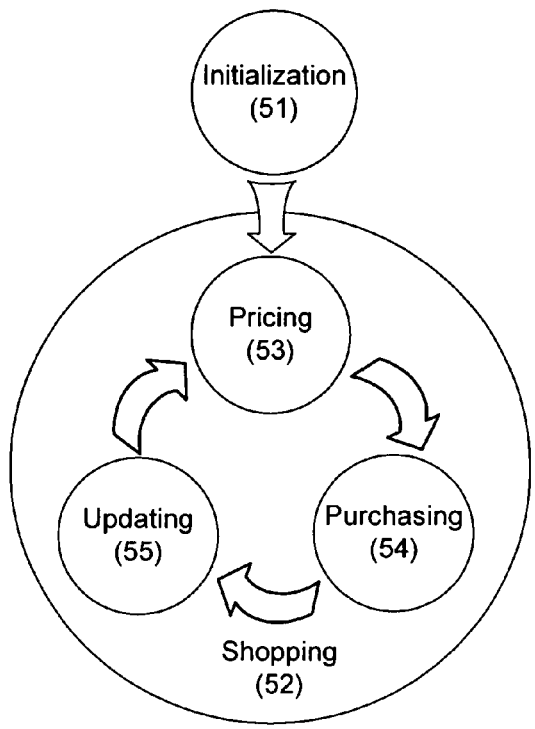
FIG. 5 is a process flow diagram showing a method for providing private demand-driven pricing, in accordance with one embodiment.

Customer privacy can be assured while allowing the pricing of online goods to dynamically adjust to meet demand by applying e-commerce marketplace private information retrieval (PIR). FIG. 5 is a process flow diagram showing a method for providing private demand-driven pricing 50, in accordance with one embodiment. Online interactions and purchases are transacted between an online seller and an online buyer of digital goods.

A first stage, initialization 51, is performed once before any purchasing takes place. Any public and secret information, such as public and secret keys for homomorphic encryption, are established and stored by the appropriate parties. In addition, an initial balance of funds is deposited into the online buyer's account.

A second stage, shopping 52, includes three phases. During the first phase, pricing 53, a potential online buyer learning the price of a digital good and decides whether to purchase. During the second phase, purchasing 54, the online buyer may engage in purchasing operations, depending upon the protocol, even if the online buyer does not desire to actually buy the digital good at the offered price. Finally, during the third phase, updating 55, the online seller updates the encrypted balance of the online buyer's account and the encrypted offered prices of the digital goods.

Private online purchasing is transacted under both protocols using a combination of partially homomorphic encryption and symmetric encryption.

Homomorphic Encryption

Encryptions and decryptions of a value x under a public key cryptosystem are respectively denoted by $E_{pk}(x)$ and $D_{sk}(x)$. The form of public key cryptosystem used in the purchasing phase is both semantically secure and partially homomorphic, defining an operator $+_h$ for the addition of ciphertexts and an operator $\times_h$ for the multiplication of a ciphertext by a known constant.

Formally, the addition $+_h$ operator can be defined:

$$D_{sk}(E_{pk}(a) +_h E_{pk}(b)) = a+b$$

for all a, b in the plaintext domain of the encryption scheme. The multiplication $\times_h$ operator can be defined:

$$D_{sk}(c \times_h E_{pk}(a)) = ca$$

for $c \in Z$, such that the result is in the plaintext domain of the encryption scheme.

Conditional Disclosure

Conditional disclosure ensures that secrets known to a server are disclosed to a requesting client if and only if certain conditions are met. A data value x is disclosed in the form $x \| h(x)$, where h is a hash function defined:

$$|h(\cdot)| = \lg\left(\frac{1}{\varepsilon}\right)$$

where $\varepsilon$ is so small as to be a negligible probability.

In practice, if the server has received $E_{pk}(y)$ from a client, the server can conditionally disclose $(x \| h(x))$ to the client if y=0 by choosing a uniformly distributed element r and using the homomorphic property of $E_{pk}(\sim)$ to send $E_{pk}([x\|h(x)]+ry)$. The client can recover x and h(x) by decrypting the ciphertext, provided y=0.

Private E-Commerce Marketplaces

Figure 6:
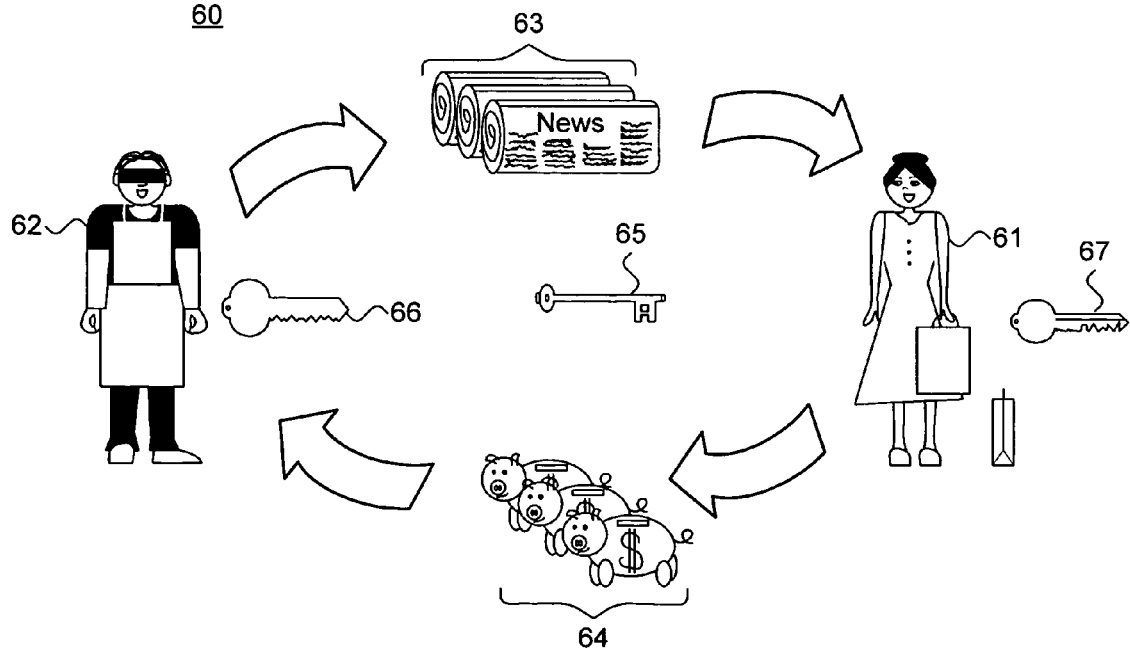
FIG. 6 is a functional block diagram showing a private e-commerce marketplace, in accordance with one embodiment.

The online seller is not allowed to compromise the online buyer's privacy and the online buyer is not allowed to compromise the online seller's privacy by obtaining digital goods for which he or she has not paid the correct price. FIG. 6 is a functional block diagram showing a private e-commerce marketplace 60, in accordance with one embodiment. Private online purchasing is transacted using a combination of homomorphic and symmetric encryption and conditional disclosure. Each online buyer 61 generates a public key encryption key pair that makes a public key 66 generally available to all parties, while keeping a corresponding private key 67 known only to the online buyer 61. The prices for digital goods 63 and the balances of client funds 64 are encrypted using the public key 66. The online buyer 61 and the online seller 62 engage in PIR using a shared symmetric key 65 to provide the digital goods 63 purchased.

Figure 7:
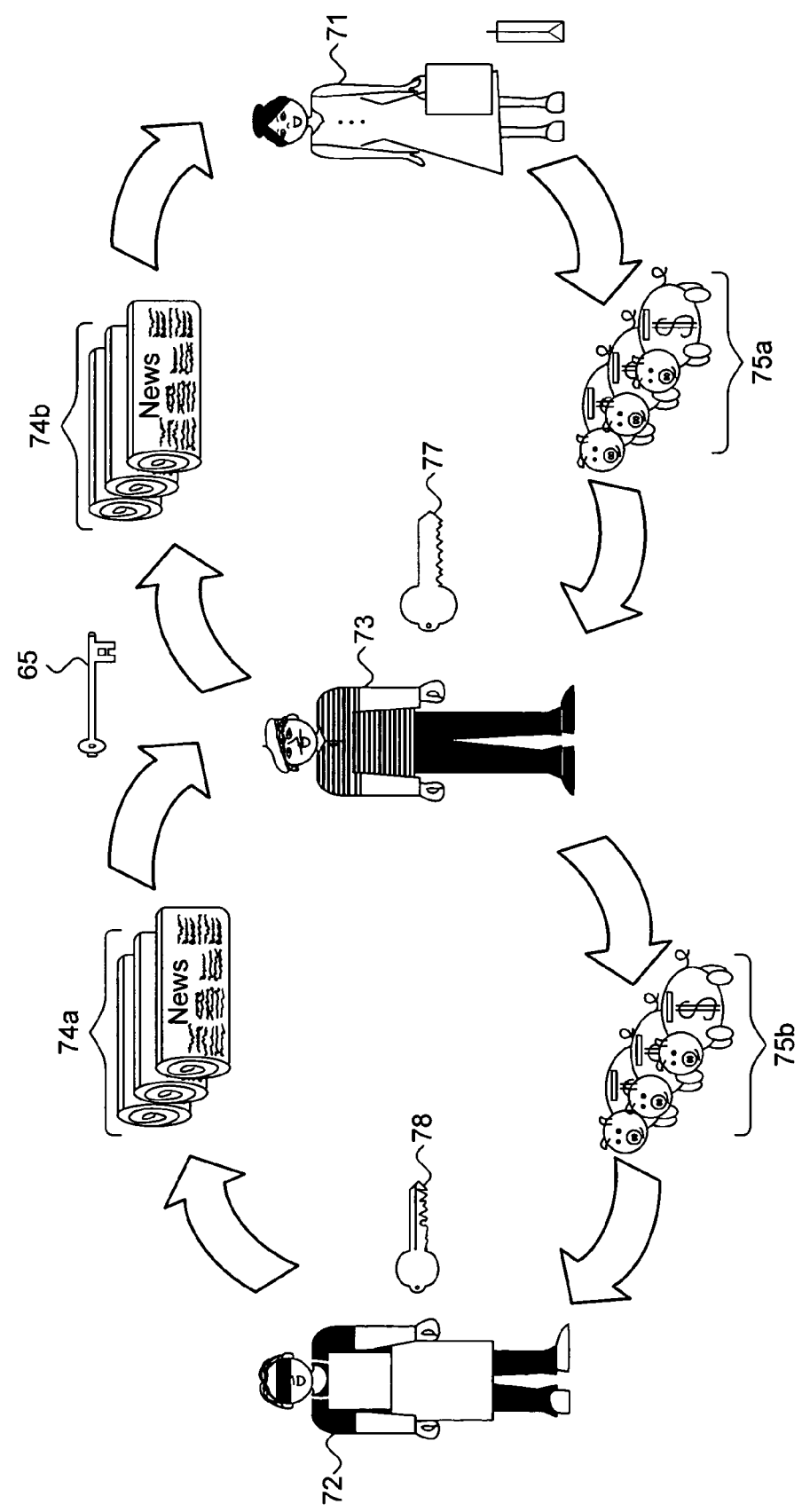
FIG. 7 is a functional block diagram showing a private e-commerce marketplace, in accordance with a further embodiment.

An intermediary translator can be interposed between an online seller and an online buyer to enable cleartext communications by the online buyer. FIG. 7 is a functional block diagram showing an intermediated private e-commerce marketplace 70, in accordance with a further embodiment. Each online buyer 71 sends cleartext messages to an intermediary translator 73 that converts the messages into ciphertexts under a common public key 77. An online seller 72 decrypts the ciphertexts through a corresponding private key 78 that is kept secret to the online seller 72. Messages from the online seller 72 to the online buyer 71 are decrypted by the intermediary translator 73, and forwarded to the online buyer 71. The balance of client funds 75a-b and prices paid for the digital goods 74a-b are encrypted under the public key 77. Other structurings of online buyers and online sellers are possible.

Goods with a Single Price and Fixed Supply Costs

Goods with generally fixed supply costs, such as music, videos, and other entertainment content, are frequently offered at one price for all types of digital goods and treated as being available to consumers in unlimited supply. With no marginal costs to affect sales volume, an online seller selling single-priced digital goods with fixed or marginal supply costs has an incentive to maximize revenue.

In one embodiment, a private online shopping protocol for digital goods offered at a single price with fixed supply costs is provided. Online buyer privacy is protected by encrypting each interaction or purchase. Thus, an online seller does not know whether online buyers are buying particular digital goods. As a result, the online seller is unable to discuss either the customer demand curve or where to set the offered price for the digital goods to maximize revenue. The protocol therefore allows price changes to occur as an artifact of each transaction by testing price increases without requiring online vendor knowledge of purchases to preserve client privacy. The protocol is performed in two stages, initialization and shopping, as described above with reference to FIG. 5.

Initialization

Figure 8:
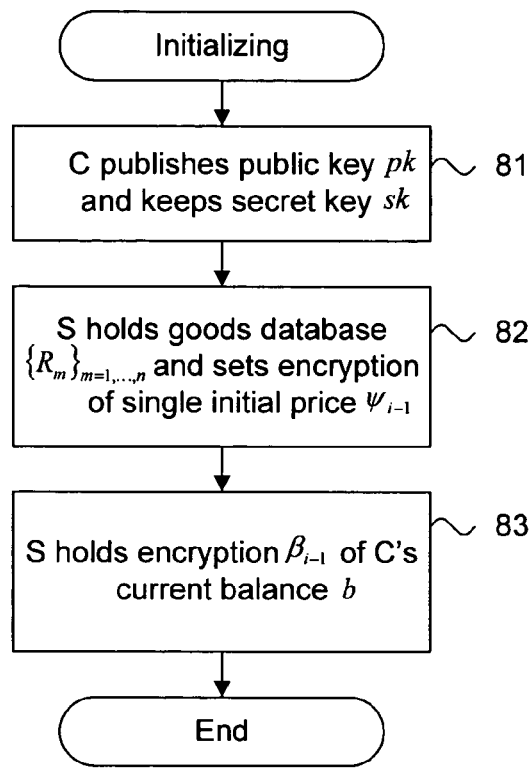
FIG. 8 is a flow diagram showing a routine for initializing a private e-commerce marketplace having goods with a single price and fixed supply costs for use in the method of FIG. 5.

Initialization is performed once before any shopping occurs. FIG. 8 is a flow diagram showing a routine 80 for initializing a private e-commerce marketplace having goods with a single price and fixed supply costs for use in the method 50 of FIG. 5. Initialization sets up the environment for private online shopping by establishing public key and symmetric key infrastructures.

Initially, the online buyer C establishes a public-private key pair by publishing a public key pk and keeping private a secret key sk (block 81). An online seller S holds a database of digital goods $\{R_m\}_{m=1,\ldots,n}$ and encrypts the single price used for initially offering the digital goods for sale $\psi_{i-1}=E_{pk}(q_{i-1})$ under the online buyer's public key pk (block 82). Additionally, the online seller S holds an encryption of the online buyers C's current balance $\beta_{i-1}=E_{pk}(b_{i-1})$ (block 83). Other initialization operations are possible.

Shopping

The shopping stage includes pricing, purchasing, and updating phases. Both the online buyer C and the online seller S participate in pricing and purchasing phases, but only the online seller S performs updating phase.

Pricing

Figure 9:
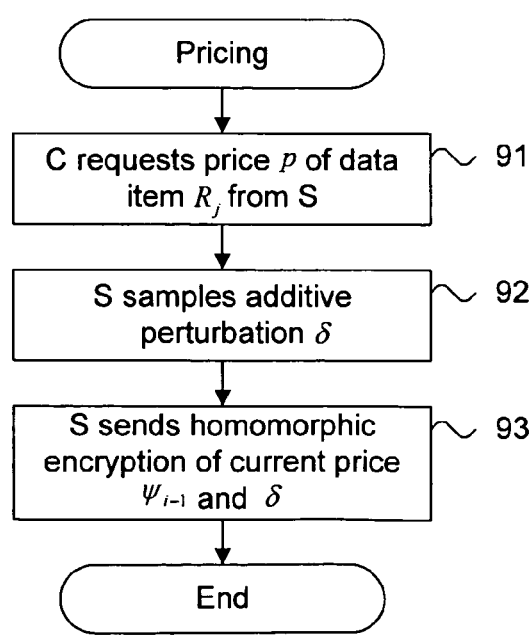
FIG. 9 is a flow diagram showing a routine for pricing within a private e-commerce marketplace having goods with a single price and fixed supply costs for use in the method of FIG. 5.

During the pricing phase, the online seller S attempts to maximize revenue by progressively increasing the price of digital goods offered "experimentally" through additive perturbation. FIG. 9 is a flow diagram showing a routine 90 for pricing within a private e-commerce marketplace having goods with a single price and fixed supply costs for use in the method 50 of FIG. 5. Additive perturbation of the fixed price enables an online seller S to experiment or test whether the current offered price is too high or too low. The outcome of the test determines the price used in the next buyer interaction. As the price is changed additively, an additive homomorphic encryption scheme is used to ensure that the online seller S does not learn the outcome of the test and thereby discover client shopping histories.

Initially, an online buyer C requests the price p of a digital good $R_j$ from the online seller S, where $j \in [n]$ (block 91). The online seller S generates an additive perturbation $\delta$, which is sampled from a fixed distribution with an expected value $0^a$, that is, having an expected value close to zero (block 92). Finally, the online seller S sends a homomorphic encryption of the additively perturbed offered price $\psi'=E_{pk}(p):=E_{pk}(\delta)+_h\psi_{i-1}$ (block 93).

Although an online buyer C could request multiple prices in the hope of receiving a favorable perturbation, each perturbation is sufficiently small and a sufficiently large number of clients interact with the online seller S to frustrate attempts to gain an advantage through multiple price requests. Other pricing operations are possible.

Purchasing

Figure 10:
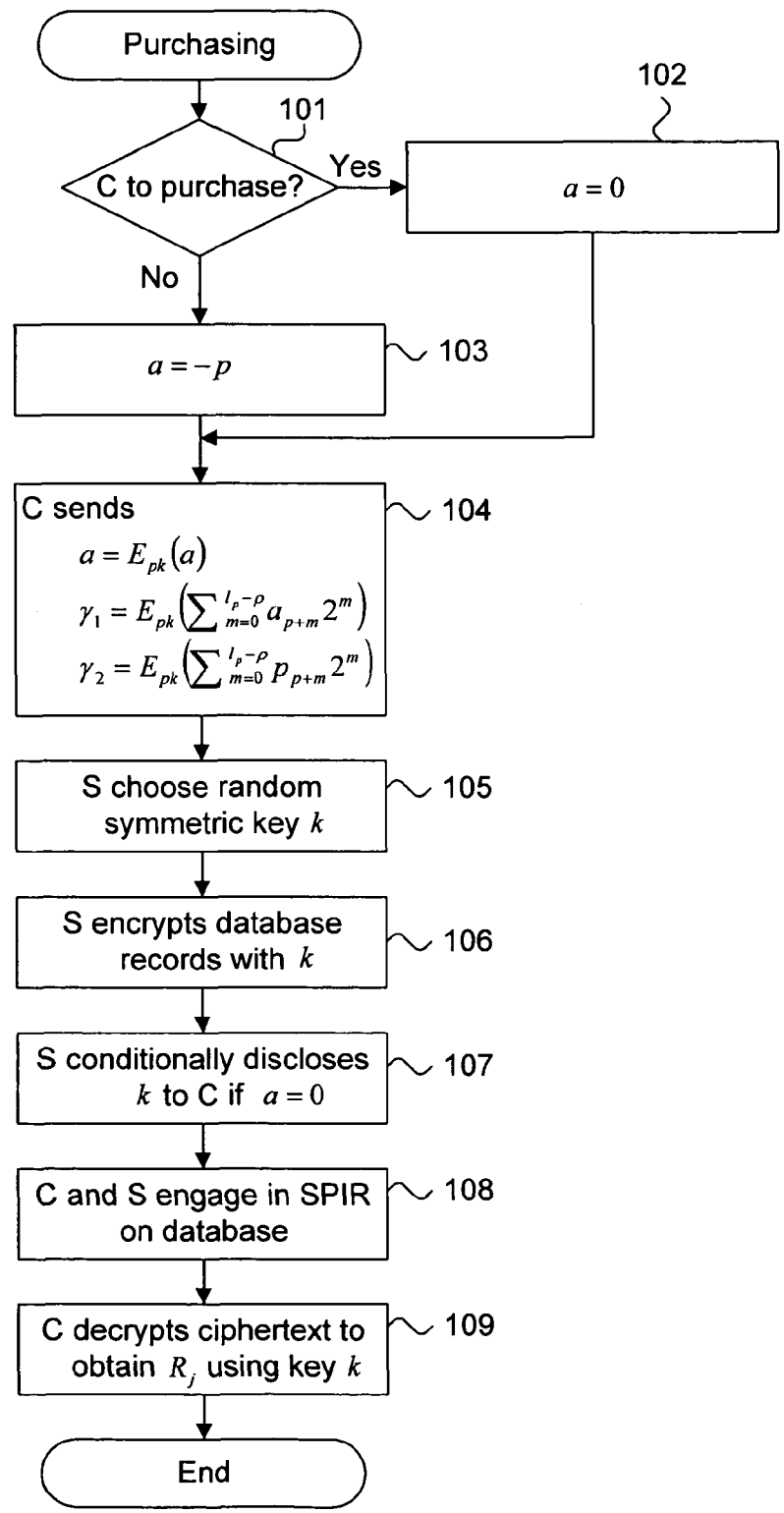
FIG. 10 is a flow diagram showing a routine for purchasing within a private e-commerce marketplace having goods with a single price and fixed supply costs for use in the method of FIG. 5.

During the purchasing phase, digital goods can be purchased by the online buyer C. FIG. 10 is a flow diagram showing a routine 100 for purchasing within a private e-commerce marketplace having goods with a single price and fixed supply costs for use in the method of FIG. 5. The purchasing phase is performed even if the online buyer C does not actually make a purchase. As a result, the online seller S does not learn whether the online buyer C is making a purchase, that is, the nature of the buyer's purchasing decision, or which particular digital good is being purchased. Private purchasing is provided through homomorphic encryption and conditional disclosure.

During the purchase of a digital good, the online seller S uses a purchasing indicator a that is homomorphically encrypted to signify the purchase of a digital good $R_j$ for the offered price p. Initially, the online buyer C decides whether to purchase the digital good $R_j$ (block 101) and sets the purchasing indicator a, such that a=0 indicates a purchase (block 102) and a=-p indicates no purchase (block 103). In both events, the online buyer C generates and sends a homomorphically encrypted triplet (block 104):

$$\alpha = E_{pk}(a)$$

$$\gamma_1 = E_{pk}\left(\sum_{m=0}^{l_p-\rho} a_{\rho+m} 2^m\right)$$

$$\gamma_2 = E_{pk}\left(\sum_{m=0}^{l_p-\rho} p_{\rho+m} 2^m\right)$$

Upon receiving the homomorphically encrypted triplet, the online seller S chooses a random symmetric key k (block 105), where $k \leftarrow \text{Gen}(1^{k_s})$, which is used to symmetrically encrypt the database records (block 107). The symmetric key k is conditionally disclosed to the online buyer C only if the decision is to purchase the digital good (block 107). The online seller S and the online buyer C engage in symmetric PIR on the encrypted database of digital goods $(\text{Enc}_k(R_m))_{m=1,\ldots,n}$ (block 108). The online buyer C will only have the symmetric key k if the digital good $R_j$ are being purchased and the online buyer C can use the symmetric key k to decrypt the ciphertext in the database to obtain the digital good $R_j$, which is the purchased digital good (block 109). Other purchasing operations are possible.

Updating

Figure 11:
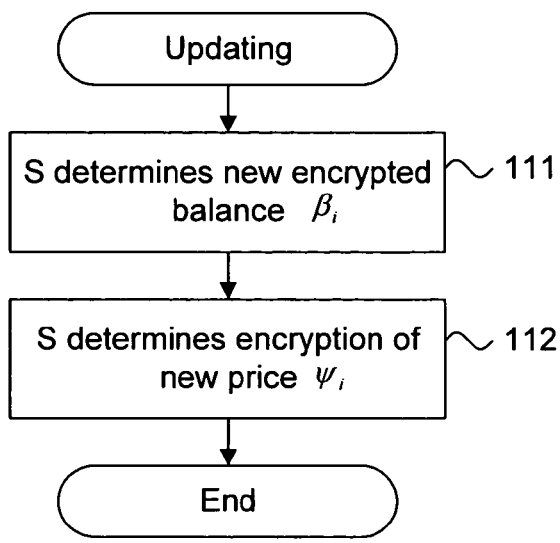
FIG. 11 is a flow diagram showing a routine for updating a private e-commerce marketplace having goods with a single price and fixed supply costs for use in the method of FIG. 5.

During the updating phase, the online seller S updates the encrypted balance of the online buyer C's account and adjusts the price of the digital goods to approach an approximate revenue maximizing price. FIG. 11 is a flow diagram showing a routine 110 for updating a private e-commerce marketplace having goods with a single price and fixed supply costs for use in the method 50 of FIG. 5. The updating phase is only performed by the online seller S.

The online seller S first determines a new encrypted balance of the online buyer C's account $\beta_i := E(b_{i-1}-(p+a)) = \beta_{i-1} +_h -1 \times_h \psi' +_h \alpha$ (block 111). The new fixed price of the digital goods is determined as a function of the results of the additive perturbation of the last price offered. The online seller S determines an encryption of the new price $\psi_i$ (block 112) as:

$$\psi_{i-1} := \psi'_{i-1} +_h \gamma_2 +_h \gamma_1 \text{ if } \delta > 0, \text{ or}$$

$$\psi_{i-1} := \psi'_{i-1} +_h (-1 \times_h \gamma_2) +_h (-1 \times_h \gamma_1) \text{ if } \delta < 0.$$

The new fixed price $\psi_i$ only increases when a purchase has been made. However, the online seller S does not learn the new fixed price $\psi_i$, which eventually closes on the approximate revenue maximizing price. Other updating operations are possible.

Demand Curve

Figure 12:
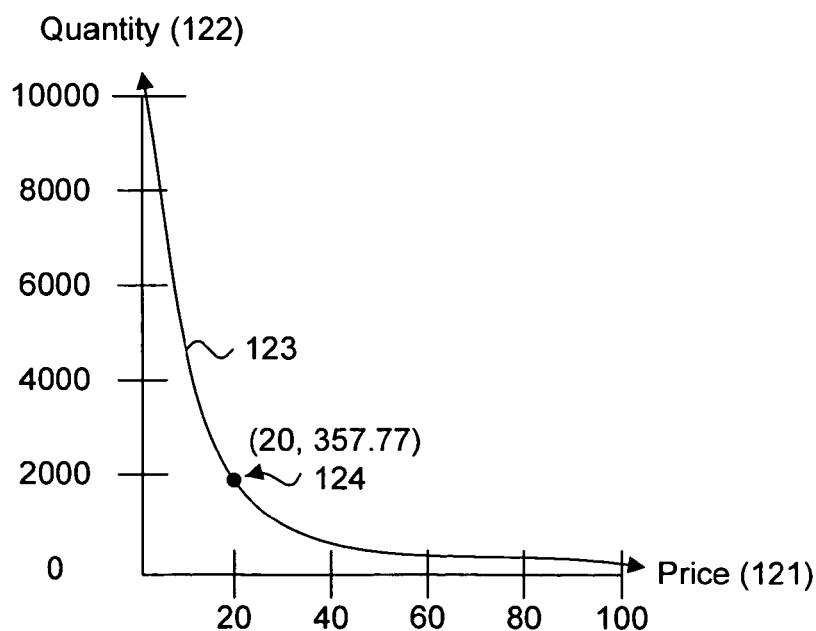
FIG. 12 is a graph showing, by way of example, a demand curve.

Additively perturbing the offered test price of fixed price digital goods by a constant tends to converge into a small neighborhood around a revenue-maximizing price, which can be empirically shown to be fairly stable over multiple client interactions. FIG. 12 is a graph 120 showing, by way of example, a demand curve 124. The x-axis represents price 121 and the y-axis represents quantity 122.

By way of illustration, the additive perturbation can be set to $$d(x) = \frac{(x-100)^2}{(\sqrt{x})},$$

with a constant c=0.039062, and an additive perturbation δ=0.1. Using an initial price of 30, the demand function d(x) can be plotted on a curve 124 as the function. Over the course of several client interactions, the price converges to the revenue-maximizing price 124 of 20. Although merely illustrative, the empirically derived demand curve 124 evidences that a target revenue-maximizing price will likely result, even where the online seller S has no a prior knowledge of the price offered and a suboptimal constant additive perturbation is used.

Goods with Multiple Prices and Variable Supply Costs

Entertainment content and other forms of digital goods that can be purchased in volumes independently from supply or marginal costs are stable, which enables an online seller to maximize revenue as a function of demand. Conversely, software and other forms of digital goods that are subject to variable supply or marginal costs require a balancing against customer demand. For instance, the sale of software licenses generally entails providing post-purchase support, which can increase the supply costs as a function of sales volume. Consequently, greater demand entails higher supply costs.

In a further embodiment, a private online shopping protocol for digital goods offered at different prices with variable supply costs is provided. By additively perturbing the price of non-identically priced digital goods offered as a function of demand and periodically adjusting the perturbed price, an online seller can allow the prices to adjust to meet demand and costs for supplying those digital goods. The protocol is also performed in two stages, initialization and shopping, as described above with reference to FIG. 5.

Initialization

Figure 13:
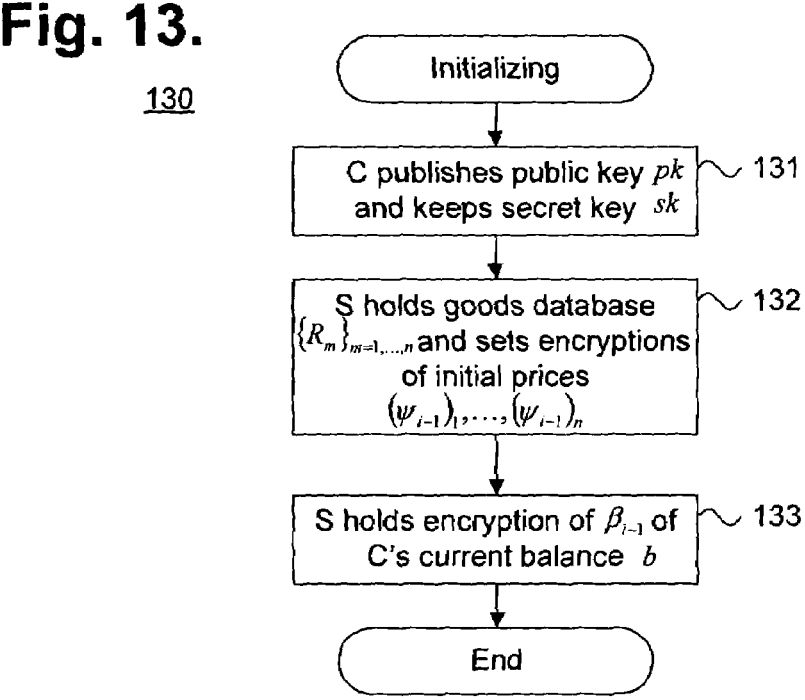
FIG. 13 is a flow diagram showing a routine for initializing a private e-commerce marketplace having goods with multiple prices and variable supply costs for use in the method of FIG. 5.

Initializing is performed once prior to purchasing of any digital goods. FIG. 13 is a flow diagram showing a routine 130 for initializing a private e-commerce marketplace having goods with multiple prices and variable supply costs for use in the method 50 of FIG. 5. Initialization sets up the environment for private online shopping by establishing public key and symmetric key infrastructures.

Initially, the online buyer C establishes a public-private key pair by publishing a public key pk and keeping private a secret key sk (block 131). An online seller S holds a database of digital goods $\{R_m\}_{m=1,\ldots,n}$ and encrypts the prices used for initially offering the each of the digital goods for sale $(\psi_{i-1})_1, \ldots, (\psi_{i-1})_n$ under the online buyer's public key pk (block 132). Additionally, the online seller S holds an encryption of the online buyers C's current balance $\beta_{i-1} = E_{pk}(b_{i-1})$ (block 133). Other initialization operations are possible.

Shopping

The shopping stage includes pricing, purchasing, and updating phases. Both the online buyer C and the online seller S participate in pricing and purchasing phases, but only the online seller S performs updating phase. Additionally, the online buyer C's participation in the pricing and purchasing phases may terminate if no purchase of the digital goods is made.

Pricing

Figure 14:
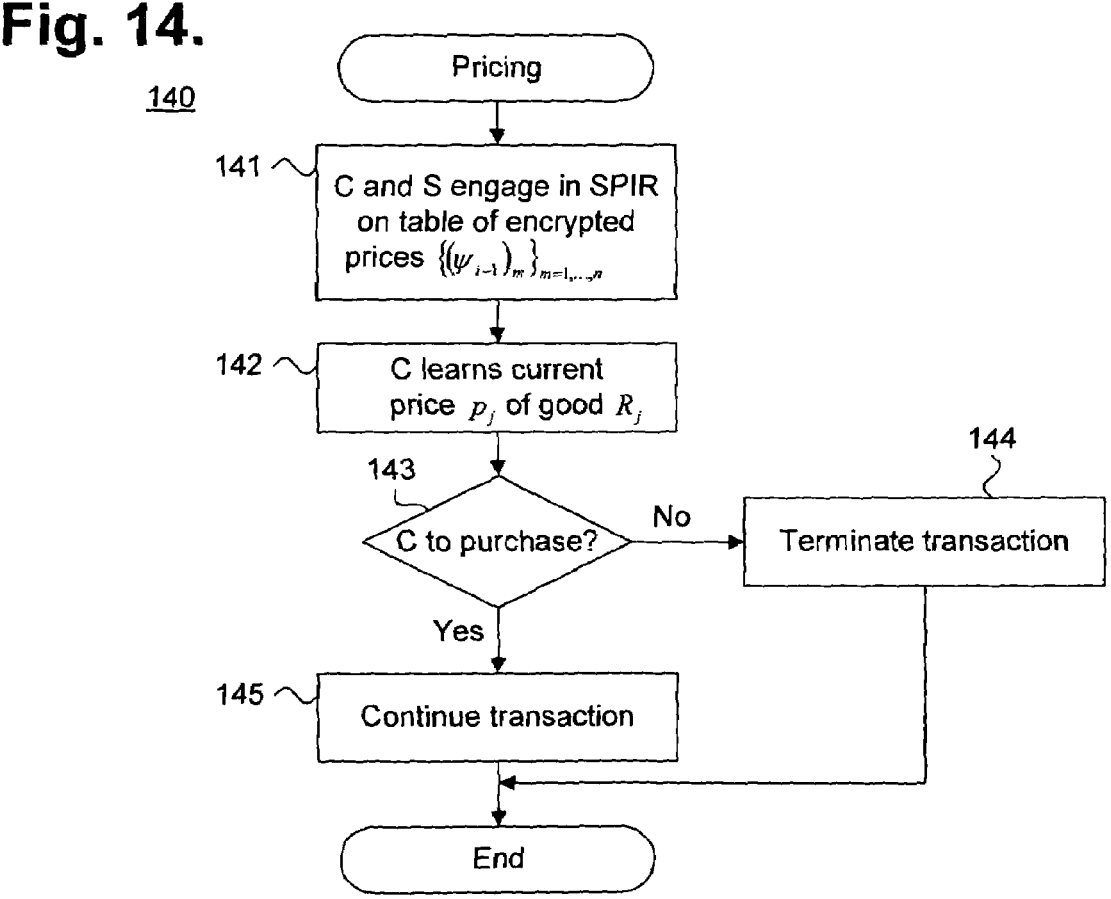
FIG. 14 is a flow diagram showing a routine for pricing within a private e-commerce marketplace having goods with multiple prices and variable supply costs for use in the method of FIG. 5.

During the pricing phase, a single price XD is assigned for a given level of demand D desired by the online seller S, whereby $d(x_D) = D$. Additionally, demand is assumed to be strictly monotonically decreasing as the price increases to reflect an assumption that the price reflects supply costs. FIG. 14 is a flow diagram showing a routine 140 for pricing within a private e-commerce marketplace having goods with multiple prices and variable supply costs for use in the method 50 of FIG. 5. Unlike the operations followed in providing private online shopping for fixed priced digital goods, as described above with reference to FIGS. 9-11, a shopping transaction is terminated whenever the online buyer C determines to not purchase a digital good. As a result, the online seller S learns that the online buyer C is making a purchase, but does not learn which particular digital good is being purchased.

Initially, an online buyer C and an online seller S engage in symmetric PIR on a table of encrypted prices for the digital goods $\{(\psi_{i-1})_m\}_{m=1,\ldots,n}$ (block 141). The online buyer C learns the current price $p_j$ of a particular digital good $R_j$ (block 142). The transaction is terminated (block 144) if the online buyer C does not desire to purchase (block 143). Otherwise, the transaction proceeds to the purchasing phase (block 145), described below with reference to FIG. 15. Other pricing operations are possible.

Purchasing

Figure 15:
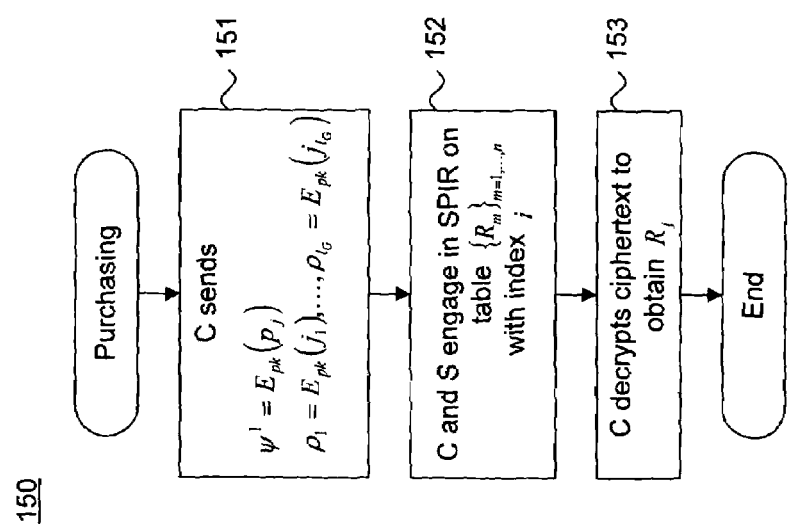
FIG. 15 is a flow diagram showing a routine for purchasing within a private e-commerce marketplace having goods with multiple prices and variable supply costs for use in the method of FIG. 5.

During the purchasing phase, the online buyer C conceals the particular digital good being purchased by communicating homomorphically encrypted prices for all of the digital goods. FIG. 15 is a flow diagram showing a routine 150 for purchasing within a private e-commerce marketplace having goods with multiple prices and variable supply costs for use in the method 50 of FIG. 5. The purchasing phase is only performed by an online buyer C when actually purchasing a digital good.

To ensure that the online seller S does not learn any information from the purchasing phase, including the current price $p_j$ of the digital good $R_j$ purchased, the online buyer C provide the price for that particular digital good as an encrypted value. Thus, the online buyer C sends a duplet to the online seller S that includes (block 151):

$$\psi'=E_{pk}(p_j)$$

$$\zeta_1=E_{pk}(j_1),\ldots,\zeta_{1_G}=E_{pk}(j_{i_G})$$

where $\psi'$ is an encryption of the price $p_j$ of the digital good $R_j$ being purchased and $\zeta_1,\ldots,\zeta_{1_G}$ is a vector of encryptions of the prices of all of the digital goods, which are both homomorphically encrypted under the public key pk of the online buyer C. The online seller S and the online buyer C engage in symmetric PIR on the encrypted database of digital goods $(Enc_k(R_m))_{m=1,\ldots,n}$ (block 152). The online buyer C will only have the symmetric key k if the digital good $R_j$ are being purchased and the online buyer C can use the symmetric key k to decrypt the ciphertext in the database to obtain the digital good $R_j$, which is the purchased digital good (block 153). Other purchasing operations are possible.

Updating

Figure 16:
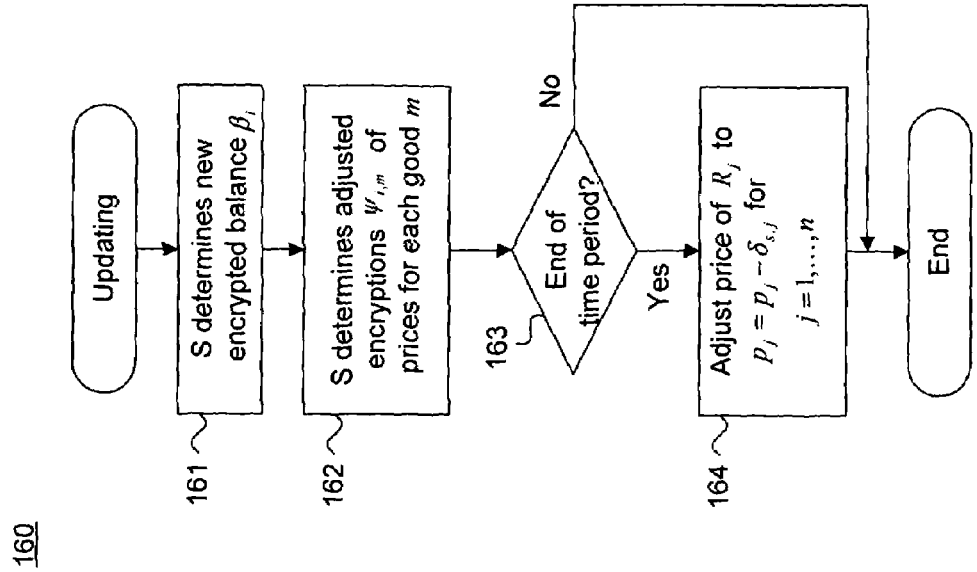
FIG. 16 is a flow diagram showing a routine for updating a private e-commerce marketplace having goods with multiple prices and variable supply costs for use in the method of FIG. 5.

To assist the updating this with settling on an equilibrium price XD, a positive perturbation constant $\delta_a$ is added to the price of a digital good each time that the digital good is purchased. Demand at a particular price is measured over a fixed short time interval. At the end of the time interval, a positive additive for perturbation $\delta_s$ is subtracted from the price of the digital good. Eventually, the price will settle to the target price $x_D$. FIG. 16 is a flow diagram showing a routine 160 for updating a private e-commerce marketplace having goods with multiple prices and variable supply costs for use in the method 50 of FIG. 5. The updating phase both revises the encrypted balance of the purchasing online buyer C's account and adjusts the encryptions of the prices of the digital goods.

The online seller S first determines a new encrypted balance of the online buyer C's account $\beta_i:=E(b_{i-1}-(p+a))=\beta_{i-1}+_h-1\times_h\psi'+_h\alpha$ (block 161). The online seller then determines adjusted encryptions of the prices $\psi_{i,m}$ for each digital good m, where ($1\leq m\leq n$) (block 162) in two steps. First, an encryption of a logical exclusive OR operation over the index m and j for each bit z is performed as:

$$v_{m,z}:=:=E_{pk}((j_r-m_r)^2)=\zeta_z+_h E_{pk}(m_z)+_h(-2m_z)\times_h\zeta_r$$

where ($1\leq z\leq l_G$) and $l_G$ is the number of bits in the index. Second, an encryption of each adjusted price is performed as:

$$\psi_{i,m}:=\psi_{i-1,m}+_h\delta_{a,1}\times_h v_{m,1}+_h\delta_{a,2}\times_h v_{m,2}+_h\cdots+_h\delta_{a,l_G}\times_h v_{m,l_G}$$

At the end of each time period (block 163), the prices for each digital good $R_j$ are subtractively adjusted to $p_j:=p_j-\delta_{s,j}$ for $j=1,\ldots,n$. The new fixed prices $\psi_{i,m}$ increase as a reflection of the desired marginal pricing level. However, the online seller S does not learn the new fixed prices $\psi_{i,m}$. Other updating operations are possible.

While the invention has been particularly shown and described as referenced to the embodiments thereof, those skilled in the art will understand that the foregoing and other changes in form and detail may be made therein without departing from the spirit and scope.

What is claimed is:

1. A computerized online system for private fixed cost digital goods pricing, comprising:
   an e-commerce server with a processor and a memory configured to execute code, comprising:
   a database to store an encrypted price of identically-priced digital goods offered for sale on an online vendor system;
   a pricing module to adjust the stored encrypted price by a constant to determine a target price;
   a seller module to update the original stored encrypted price of the digital good with the adjusted encrypted price, wherein said updated encrypted price is not known to the seller module and approaches the target price; and
   an encryption module to homomorphically encrypt the adjusted encrypted price to create a homomorphically encrypted price; and
   a purchaser client with a processor and memory to execute code to provide to the online vendor system purchasing decision information about a particular digital good at the homomorphically encrypted price regardless of whether the decision is to purchase the particular digital good, wherein the purchasing decision information does not include the identity of the particular digital good.

2. A system according to claim 1, wherein the original stored encrypted price is additively adjusted to create the adjusted encrypted price.

3. A system according to claim 1, further comprising:
   a symmetric key under which the digital goods are encrypted by partially homomorphic encryption and symmetric encryption, wherein the symmetric key is disclosed to the purchaser system on the condition that the purchasing decision information includes a decision to purchase the particular digital good.

4. A system according to claim 2, wherein the additively-adjusted price is provided without revealing the particular digital good and the nature of the purchasing decision.

5. A method for private fixed cost digital goods pricing, comprising the steps of:
   offering for sale on an online vendor system a plurality of digital goods with an identical price;
   encrypting the price;
   storing the encrypted price on a database;
   determining a target price by adjusting the stored encrypted price by a constant;
   homomorphically encrypting the adjusted encrypted price to create a homomorphically encrypted price;
   providing to the online vendor system purchasing decision information about a particular digital good at the homomorphically encrypted price regardless of whether the decision is to purchase the particular digital good, wherein the purchasing decision information does not include the identity of the particular digital good; and updating the original stored encrypted price of the digital goods with the adjusted encrypted price, wherein said updated encrypted price is not known to the online vendor system and approaches the target price, wherein all the steps are executed on a suitably programmed computer.

6. A method according to claim 5, further comprising:
additively adjusting the original stored encrypted price to create the adjusted encrypted price.

7. A method according to claim 5, further comprising:
encrypting the digital goods under a symmetric key;
disclosing the symmetric key on the condition that the purchasing decision information includes a decision to purchase the particular digital good; and
retrieving the encrypted digital good by applying the symmetric key within a partially homomorphic encryption and symmetric encryption.

8. A method according to claim 6, wherein the additively-adjusted price is provided without revealing the particular digital good and the nature of the purchasing decision.

9. A computerized online system for providing private demand-driven pricing for fixed cost digital goods, comprising:
an e-commerce server with a processor and a memory configured to execute code, comprising:
a database to store an encrypted price of identically-priced digital goods offered for sale on an online vendor system that has been additively-adjusted, wherein a target price has not been realized;
a pricing module to decrypt the digital good purchased by applying the symmetric key to a partially homomorphic encryption metric encryption;
an encryption module to homomorphically encrypt the additively-adjusted price to create a homomorphically encrypted price; and
a seller system module to update the original encrypted price of the digital goods, wherein said encrypted price is not known to the seller system module and approaches the target price whenever a purchase is made; and
a purchaser client with a processor and a memory to execute code, comprising:
a purchasing module to send to the online vendor system purchasing decision information about one of the digital goods at the homomorphically encrypted price regardless of whether the decision is to purchase one of the digital goods, wherein the purchasing decision information does not include the identity of the particular digital good, and to receive in return, on the condition that the purchasing decision information includes a decision to purchase the digital good, a symmetric key under which the digital goods in the database have been encrypted.

10. A system according to claim 9, wherein the seller system determines a new balance of an account held by the purchaser client comprising a homomorphic encryption of a current balance debited by the additively-adjusted price of the digital goods.

11. A method for providing private demand-driven pricing for fixed cost digital goods, comprising the steps of:
additively adjusting an encrypted price of identically-priced digital goods that are stored in a database by a seller system, wherein a target price has not been realized;
homomorphically encrypting the additively-adjusted price to create a homomorphically encrypted price;
sending purchasing decision information about one of the digital goods at the homomorphically encrypted price regardless of whether the decision is to purchase one of the digital goods from a purchaser system to the seller system, wherein the purchasing decision information does not include the identity of the particular digital good;
receiving in return, on the condition that the purchasing decision information includes a decision to purchase the digital good, a symmetric key under which the digital goods in the database have been encrypted;
decrypting the digital good purchased by applying the symmetric key to a partially homomorphic encryption and symmetric encryption; and
updating the encrypted price of the digital goods, wherein said encrypted price is not known to the seller system and approaches the target price whenever a purchase is made,
wherein all the steps are executed on a suitably programmed computer.

12. A method according to claim 11, further comprising:
determining a new balance of an account held by the purchaser system comprising a homomorphic encryption of a current balance debited by the additively-adjusted price of the digital goods.

* * * * *